July 5, 1966 W. P. HICKMAN Re. 26,056

COMBINATION WATER DAM AND GRAVEL STOP

Original Filed Jan. 16, 1961

INVENTOR.
WILLIAM P. HICKMAN

BY Whittemore, Hulbert & Belknap

ATTORNEYS

United States Patent Office

Re. 26,056
Reissued July 5, 1966

26,056

COMBINATION WATER DAM AND GRAVEL STOP

William P. Hickman, 1360 E. Maple Road, Birmingham, Mich.

Original No. 3,100,951, dated Aug. 20, 1963, Ser. No. 82,911, Jan. 16, 1961. Application for reissue May 24, 1965, Ser. No. 459,530
7 Claims. (Cl. 52—94)

Matter enclosed in heavy brackets [ ] appears in the original patent but forms no part of this reissue specification; matter printed in italics indicates the additions made by reissue.

This invention relates generally to building structures and refers more particularly to a combination water dam, gravel stop and facia for the edge of a flat roof deck.

One object of this invention is to provide an improved seal for the edge of a roof which will prevent water or gravel bitumen drippage down the face of the building.

Another object of the invention is to provide novel means for locking the facia in position along the edge of the roof deck.

Another object of the invention is to provide a combination water dam, gravel stop and facia for the edge of a flat roof deck which comprises a cant secured to the edge of the roof deck over which is laid the edge portion of the roofing material, a generally upright facit extending along the edge of the roof deck, and means for locking the facia in position including a flashing extending along and secured to the cant and having one edge engaging the facia.

Another object of the invention is to provide a combination water dam, gravel stop and facia as described in the preceding paragraph in which the flashing is a resilient rocker-type member so formed that, when it is in its free state and engages the facia, its opposite edge is spaced from the roofing material, but in which the flashing can be flexed from its free state by suitable fasteners tensioning its engagement with the facia. The fasteners thread through the cant and through the roofing material, and seals are provided for each fastener to prevent seepage of water or gravel bitumen through the holes in the roofing and cant, down the face of the building.

Other objects, advantages and novel features of the invention will become more apparent as the following description proceeds, especially when considered with the accompanying drawings, wherein.

Figure 1:
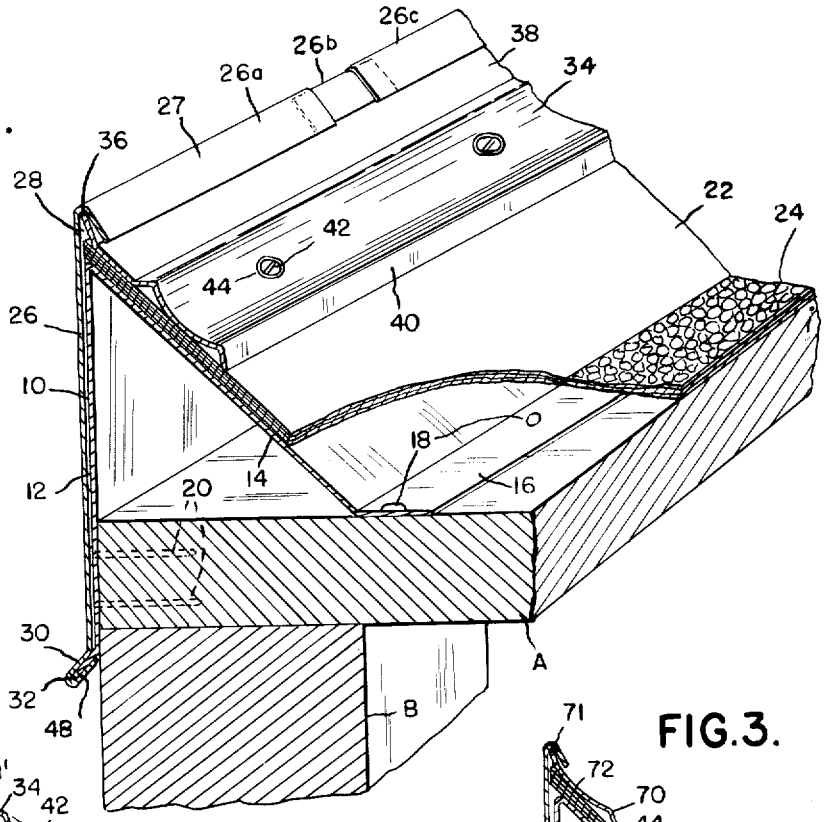
FIGURE 1 is a vertical sectional view, in perspective, showing one embodiment of my invention.

Referring now more particularly to the drawings and especially to FIGURE 1 thereof, the combination water dam, gravel stop and facia is in effect a border frame which extends about the periphery of a roof deck to contain the water and gravel bitumen on the top of the roof and prevent it from spilling over the sides. The facia also provides a neat finished appearance.

The letter A denotes the base roof deck of a building and the letter B denotes a vertical member extending beneath the roof deck. An elongated sheet metal cant 10 is provided having a vertical leg 12 extending above the roof deck and an inclined leg 14 extending at an angle in a downward direction from the upper edge of the vertical leg. The inclined leg terminates at the top of the roof deck A in a horizontal extension 16 in flush surface-to-surface engagement with the top surface of the roof deck and is secured thereto by fasteners 18. Additional fasteners 20 are provided to secure the vertical leg 12 of the cant flush against the edge of the roof deck A.

The roof deck is covered with layers of roofing material 22 overlaid by a layer of gravel bitumen 24. The edge portion of the roofing material extends up along the inclined leg 14 of the cant. An elongated facia 26 is provided which is in the form of a vertical sheet metal member having a down-turned upper edge portion 27 forming a generally downwardly opening channel 28 at the upper edge. The lower edge of the facia is formed with a downwardly and outwardly inclined portion 30 providing a drip which is return-bent to form an upwardly and inwardly opening channel 32. As seen in FIGURE 1, the facia member is formed of like longitudinally extending members 26a, 26b and 26c, which overlap end for end. The facia elements 26a and 26c are rather long elements which extend along the front side of the cant, and the element 26b is simply a joint to close the gap between the adjacent edges of the long elements 26a and 26c. The joint element 26b is shown on the inside of the elements 26a and 26c, but could just as well overlap on the outside. However, the inside lap shown in FIGURE 1 provides a neater appearance. In some instances, the joint 26b might be eliminated and the long elements 26a and 26c might overlap one another. All of the facia member elements have the same cross-section, as illustrated particularly with respect to elements 26a in FIGURE 1.

A flexible rocker flashing in the form of an elongated metal strip is also provided, having the configuration shown in section in FIGURE 1. The upper edge 36 of the flashing 34 projects into the channel 28. The intermediate portion 38 of the flashing rests on or presses against the upper marginal portion of the roofing material, and the lower edge portion has a lip 40 which is turned downwardly as illustrated.

In the normal, free or unflexed state of the flashing, with the upper edge 36 located within the channel 28 of the facia, the lower edge 40 is spaced above the roofing material. In other words, the flashing assumes the dotted line position shown in FIGURE 2. The flashing is then secured to the cant by screws 42 which extend through holes in the flashing and through holes in the roofing material and inclined leg 14 of the cant. The screw heads press the portions of the flashing surrounding the holes therein tight against the roofing material, so that the flashing is bowed between the lip 40 and the intermediate portion 38, as illustrated. Washers 44 of neoprene or like sealing material surround the shanks of the screws between the flashing and the heads of the screws. The screw heads press the washer material tight against the flashing and squeeze the inner margins of the washer material through the holes in the flashing into sealing contact with the roofing material in the area around each hole therein. Hence the holes in the roofing material are sealed against the entrance of water. This is very important, because if water could get into the holes in the roofing material it would seep through the holes in the cant and eventually drip down the face of the building creating an unsightly appearance. The lower edge of the lip 40 is also pressed tight against the roofing material to provide a further seal against the seepage of liquid. However, the primary seal for the holes in the roofing material is provided by the washers 44. The generally upstanding lip 40 has the further effect of providing a barrier against snow or water which might be driven by wind up the incline of the cant. This will prevent moisture from reaching the area of the screw heads. The tension produced by the flexing of the flashing is transmitted to the upper edge 36 of the flashing to produce an upward tension on the facia. This is opposed by the inclined flange 48 on the lower edge of the vertical leg 12 of the cant which projects into the channel 32.

No other means than the means described are provided for securing the facia elements in position. They are held in tension along both the upper and lower edges.

These elements are free to expand and contract longitudinally since they are free to slide relative to one another at the points of overlap. It might also be added that the flashing may be formed in overlapping longitudinally extending elements, rather than in one continuous element.

Figure 2:
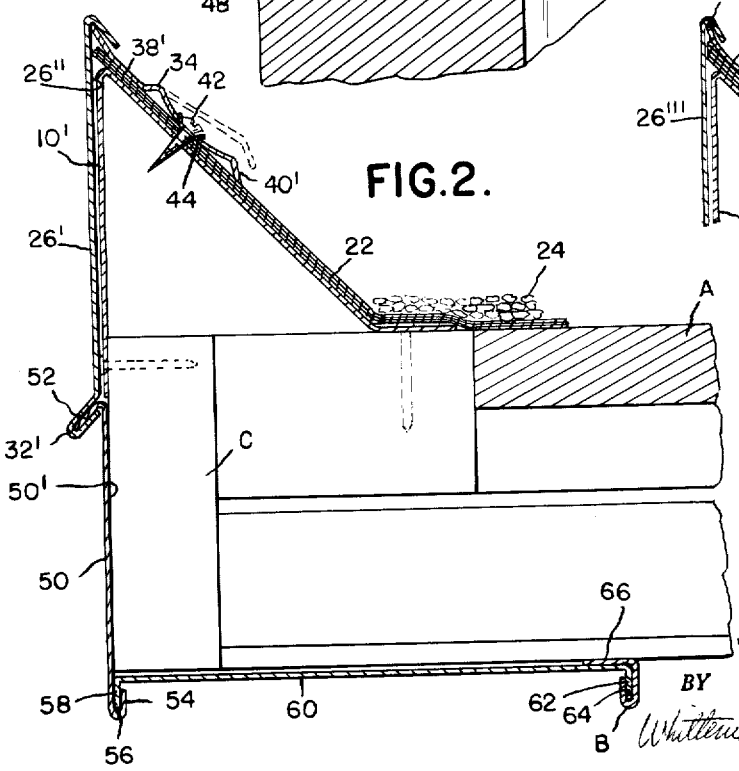
FIGURE 2 is a vertical sectional view showing another embodiment of my invention.

The construction shown in FIGURE 2 is somewhat different from that described above. The roof deck A projects over and beyond the wall of the building B. A border frame member C extends along the edge of the roof deck. The cant is generally indicated at 10' and is of exactly the same construction as the cant 10 shown in FIGURE 1 except that it does not have the lower flange 48. The facia 26' is exactly like the facia 26 shown in FIGURE 1. The rocker flashing 34' is exactly like the rocker flashing 34 described above.

The facia also includes a lower section 50 which is in the form of an elongated flat sheet metal member having at the upper edge an outwardly and downwardly inclined flange 52 fitting into the channel 32', and at the bottom it has a return-bent edge portion 54 defining a channel 56. This lower channel 56 opens in an upward direction and receives a down-turned flange 58 on the soffit 60. The soffit is secured to the underside of the overhanging portion of the roof deck and its opposite end has a down-turned flange 62 which is disposed within a channel 64 formed in an angle bracket 66 secured to the underside of the roof deck.

The holes in the roofing material are sealed by the washers 44 in exactly the same manner as described above in connection with FIGURE 1. When the screws 42 are tightened, the portion of the flashing between the intermediate portion 38' and the lip 40' is bowed so that the washers are squeezed into the holes in the flashing to seal against the roofing material about the holes therein, and the lower edge of the lip is pressed tight against the roofing material. The upper edge of the flashing extends within the upper channel in the upper facia member to tension the same.

It should be pointed out that the upper and lower facia sections 26' and 50 are preferably also formed of longitudinally extending elements which are overlapped end for end, as in the FIGURE 1 construction. Hence, the upper section 26' may be made up of rather long elements of like configuration with the space between their adjacent ends closed by a joint element similar to **26*b* in FIGURE 1, which may be on the inside as shown in FIGURE 1 or on the outside. Such a joint element is indicated at 26''. The lower section 50 may be formed of like longitudinally extending elements having the cross-section shown in FIGURE 2, the space between the adjacent ends thereof being closed by a similarly shaped joint element indicated at 50'. The joint element might overlap on the inner sides of the long elements, or on the outer sides thereof. The elements of the upper and lower facia sections are held in position by the means illustrated and described, and no other means are employed. Accordingly, the facia elements may expand and contract and their overlapping surfaces may slide relative to each other in response to the expansion and contraction thereof. With respect to both upper and lower sections 26' and 50**, the joint elements may be omitted and the long elements thereof will then simply overlap as described in connection with FIGURE 1.

Figure 3:
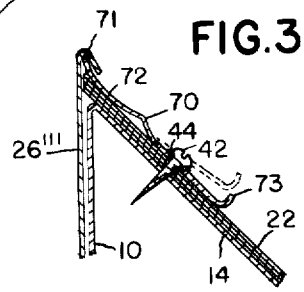
FIGURE 3 is a fragmentary sectional view showing a further modification.

FIGURE 3 illustrates a modification in the flashing construction, which is applicable to both the FIGURE 1 and FIGURE 2 constructions. The rocker flashing is indicated generally at 70 and is shown in its flexed or applied position in solid lines. The flashing assumes the dotted line position in its free state. It likewise is formed of a suitable flexible resilient metal. The upper edge 71 of the flashing extends into the upper channel in the facia. The flashing has an intermediate fulcrum point 72. The screws 42 extend through holes in the flashing and likewise through holes in the roofing material and in the leg 14 of the cant. The washers 44 are squeezed through the flashing holes by the screw heads into sealing engagement with the roofing material in the regions surrounding the holes therein. The portion of the flashing from the screw holes to the lower edge thereof is pressed flat against the roofing material and at the lower edge the flashing has a lip 73 which projects outwardly to form a barrier against snow or water which might be blown up the incline. The facia is indicated generally at 26''', which facia may correspond to that of FIGURE 1 or FIGURE 2.

What I claim as my invention is:

1. A combination water dam, gravel stop and facia for the edge of a roof deck, comprising a cant secured to the edge of the roof deck and having an inclined surface sloping upwardly and outwardly from the roof deck, roofing material laid over said roof deck having a marginal portion overlying said inclined surface of said cant, a generally upright facia member extending along the edge of the roof deck, said facia member having a downwardly opening channel above said cant, and means for sealing the marginal portion of said roofing material and for holding said facia member in position including an elongated flexible, resilient rocker flashing strip extending along said inclined surface of said cant in overlying relation to the marginal portion of said roofing material, said flashing strip having a longitudinally extending section which is concavo-convex in cross-section with the convex side facing toward the marginal portion of said roofing material, the intermediate longitudinal portion of said concavo-convex section engaging the marginal portion of said roofing material, said flashing strip engaging within the channel of said facia member with an upward pressure along the edge of said flashing strip at one side of the intermediate portion thereof, and clamping means engaging said flashing strip at the opposite side of said intermediate portion and pressing the same toward the marginal portion of said roofing material tending to straighten the cross-sectional outline of said concavo-convex section and to tension the same, thereby to increase the pressure of engagement of said edge of said flashing strip within said channel and of the intermediate portion of said concavo-convex section with the marginal portion of said roofing material.

2. The combination defined in claim 1, wherein said flashing strip engages said facia member along one edge of said concavo-convex section, said flashing strip has an integral lateral extension along the opposite edge of said concavo-convex section, and said clamping means engages said extension.

3. The combination defined in claim 1, wherein means fixed relative to the roof deck are provided to engage said facia member at a point spaced below said channel to oppose the upward pressure thereon and to cooperate with said rocker flashing strip in holding said facia member in position.

4. The combination defined in claim 1, wherein said clamping means includes a fastener extending through aligned holes in said flashing strip, in the inclined surface of said cant and in the marginal portion of said roofing material, said fastener having a head overlying said fishing strip, and a sealing washer between said head and said flashing strip, said fastener head engaging said washer and pressing the same through the hole in said flashing strip and into sealing engagement with said marginal portion of the roofing material to seal the hole therein.

5. The combination defined in claim 2, wherein said extension of said flashing strip has an edge portion spaced from said concavo-convex section engaging the marginal portion of said roofing material, and said clamping means is between said concavo-convex section and said edge portion.

*6. A combination water dam, gravel stop and facia for the edge of a roof deck, comprising a cant secured to the edge of the roof deck and having an inclined surface slop-*

*ing upwardly and outwardly from the roof deck, roofing material laid over said roof deck having a marginal portion overlying said inclined surface of said cant, a generally upright facia member extending along the edge of the roof deck, said facia member having a downwardly opening channel above said cant, and means for sealing the marginal portion of said roofing material and for holding said facia member in position including an elongated resilient flashing strip extending along said inclined surface of said cant in overlying relation to the marginal portion of said roofing material, one longitudinal edge portion of said flashing strip engaging within the channel of said facia member with an upward pressure, and clamping means securing said flashing strip down firmly upon the marginal portion of said roofing material, said clamping means engaging said flashing strip at points spaced from said one longitudinal edge portion of said flashing strip transversely thereof, and a longitudinally extending portion of said flashing strip between said one longitudinal edge portion and said clamping means engaging said roofing material and acting as a fulcrum so that the downward pressure of said clamping means increases the upward pressure of engagement of said one longitudinal edge portion of said flashing strip within the channel of said facia member.*

*7. A combination water dam, gravel stop and facia for the edge of a roof deck, comprising a cant secured to the edge of the roof deck and having an inclined surface sloping upwardly and outwardly from the roof deck, roofing material laid over said roof deck having a marginal portion overlying said inclined surface of said cant, a generally upright facia member having a downwardly facing*

*contact surface above said cant, and means for sealing the marginal portion of said roofing material and for holding said facia member in position including an elongated resilient flashing strip extending along said inclined surface of said cant in overlying relation to the marginal portion of said roofing material, one longitudinal edge portion of said flashing strip engaging said downwardly facing contact surface of said facia member with an upward pressure, clamping means securing said flashing strip down firmly upon the marginal portion of said roofing material, and means cooperating with said clamping means for maintaining the upward pressure relation aforesaid between said flashing strip and said facia member.*

References Cited by the Examiner

The following references, cited by the Examiner, are of record in the patented file of this patent or the original patent.

UNITED STATES PATENTS

| | | | |
|---|---|---|---|
| 164,602 | 6/1875 | Shepard | 52—96 |
| 1,337,840 | 4/1920 | Hawley | 52—62 |
| 2,160,758 | 5/1939 | Schurman | 52—96 |
| 2,219,992 | 10/1940 | Hanson | 52—60 |
| 2,250,548 | 7/1941 | Ness | 52—60 |
| 2,734,602 | 2/1956 | Dawson | 52—97 |
| 2,857,861 | 10/1958 | Trostle | 52—94 |
| 3,012,376 | 12/1961 | Reddy et al. | 52—62 |
| 3,024,573 | 3/1962 | McKinley | 52—62 |

FRANK L. ABBOTT, *Primary Examiner.*

M. O. WARNECKE, *Assistant Examiner.*